United States Patent [19]

Vastag

[11] 4,062,703

[45] Dec. 13, 1977

[54] SAND CONTAINING FLUX

[75] Inventor: Joseph Vastag, Oakland, Calif.

[73] Assignee: W. R. Grace & Co., Cambridge, Mass.

[21] Appl. No.: 632,209

[22] Filed: Nov. 17, 1975

[51] Int. Cl.² .............................................. B23K 35/34
[52] U.S. Cl. ........................................ 148/26; 148/23
[58] Field of Search ...................................... 148/23, 26

[56] References Cited

U.S. PATENT DOCUMENTS 3,814,637   6/1974   Scott ........................................ 148/26

Primary Examiner—Peter D. Rosenberg
Attorney, Agent, or Firm—Lowell H. McCarter; C. E. Parker

[57] ABSTRACT

Zinc ammonium chloride type fluxes can be made that have longer life and reduced smoke characteristics by incorporating 1 to 50% sand into conventional fluxes for use on metal container side seam soldering baths, as well as into galvanizing fluxes.

7 Claims, No Drawings

SAND CONTAINING FLUX

THE PRIOR ART

In the manufacture of sanitary can bodies, suitably notched sheet metal blanks are fed to a forming station where they are shaped and where the opposed marginal edges which ultimately form the side seam of the can are reversely bent into oppositely directed body hooks. The body hooks are then interengaged and flattened by bumping to form an interlocked seam. After this forming operation, the can bodies are conveyed in longitudinal spaced relationship over a rotating solder roll which engages against the seam of the bodies as they are moved edgewise therealong. The solder roll, partially submerged in a bath of molten solder, raises the solder in a film and wipes it into the side seam. Ordinarily, the molten solder is maintained at a temperature considerably in excess of its melting point so that it will remain fluid until capillarity has drawn enough liquid into the seam to flood it.

In order to keep the surface of the solder roll clean and "tinned", it is customary to use a flux on the side of the bath where the roll enters the solder. For this purpose, the flux employed must be capable of efficiently removing oxide coatings and other interfering films from the roll so as to create surface conditions which will permit the molten solder to flow freely and spread completely over the working surface of the roll. Also, the flux must have a reasonably long pot life, i.e., the wetting properties and cleaning efficiency of the flux should extend over a period of several hours under the operating conditions employed.

Because of the low tin-content solders used in the can making industry today, solder baths must be maintained at comparatively high temperatures. For example, the tin-lead solders currently employed contain about 5 percent or less tin and have a melting point in excess of 600° F. Therefore, the soldering baths must be maintained at a temperature in the range of between about 670° and 780° F., and usualy between about 725° and 760° F. so that the molten solder will have the flow characteristics necessary to allow a sufficient amount of material to enter the body seams to provide the necessary hermetic seal.

While various fluxes have been employed with tin-lead solders, zinc-ammonium chloride fluxes are most widely used. One of the most satisfactory fluxes of this type contains a body of low density, inert, granular siliceous particles capable of absorbing the fused zinc-ammonium salts. This flux, compared to an identical composition without a siliceous granular absorber, is active over longer periods of time under similar operating conditions. However, in order to achieve and maintain top production speeds, the can making industry today prefers a flux having an even longer pot life especially at temperatures of 800° F. and higher so that there will be fewer delays for replenishing the spent flux. Also, ecological and health considerations indicate the need for sensible reduction in the production of the corrosive smoke which normally attends can tinning operations.

Recent attempts to meet these more demanding specifications have resulted in the development of highly successful fluxes containing either carbon black, as described by O'Brien in U.S. Pat. No. 3,796,611, or finely divided magnesium silicate, as taught by Scott in U.S. Pat. No. 3,814,637.

Other approaches to these problems have involved either the use of porous particulate absorbents such as alumina, silica gel and activated alumino-silicate, or micron-size vicosity thickeners selected from silica, alumina, silicates, titanium dioxide and other similar materials. These approaches are disclosed by Shanklin in U.S. Pat. No. 3,350,244 and in Canadian Pat. No. 964,969, respectively.

SUMMARY OF THE INVENTION

Fluxes capable of extended life with significantly reduced smoke production can be prepared for use on high temperature solder baths by incorporating sand into conventional zinc ammonium chloride fluxes. It has been found that it is possible in this manner to increase the pot life of the fluxes at high soldering temperatures and/or to decrease the quantity of volatile ammonium chloride that must be used, thus reducing further the emission of undesirable smoke. The fluxes of this invention thus contain between 1 and 50% by weight of ordinary sand, preferably 5 to 25%, in addition to the other usual ingredients, which may include zinc oxide, zinc carbonate, carbon black, light weight particulate siliceous material, alkali metal salts and certain organic resins. Sand can also be used in the same proportions with galvanizing fluxes.

DETAILED DESCRIPTION

In preparing the flux of the present invention, zinc chloride and ammonium chloride may be combined in the various proportions known to the art. The desired proportions may be achieved by adding the single salts ($ZnCl_2$ and $NH_4Cl$), the double salt ($ZnCl_2 \cdot 2NH_4Cl$), the triple salt ($ZnCl_2 \cdot 3NH_4Cl$)

or mixture of these single, double and triple salts.

The total amount of zinc chloride-ammonium chloride mixture used in the flux may vary over a wide range depending upon the other ingredients employed. However, the composition should contain at least about 60% by weight of this chloride mixture in order that rapid and effective removal of metal oxide film for the solder roll surface be insured.

In addition to the zinc ammonium chloride component just described, the flux of the invention must contain, on a weight basis, from about 1 to 50%, preferably 5 to 25%, or ordinary sand with a specific gravity of about 2.6 to 2.7 and a particle size ranging from fine to number 8 mesh, U.S.

The actual proportion of sand will depend on factors such as its particle size, on can manufacturing conditions and on the proportion of ammonium chloride in a particular flux. Thus, for example, in the high ammonium chloride fluxes of the art, i.e. those containing from 26 to 32% $NH_4Cl$ by weight, enough sand is desirably added to constitute about 10% of the weight of the final flux mixture, with this addition permitting a decrease in ammonium chloride content to a level of about 18%.

As intimated earlier, sand may be used in conjunction with any other conventional particulate inorganic additive of the fluxing art to variously improve pot life, ammonium chloride consumption and/or smoke emission. Among this class of materials for which sand is not a substitute are: carbon black, about 1.5 to 5%; light particulate siliceous materials such as expanded perlite, exfoliated vermiculite, pumice, diatomaceous earth and the like, up to about 12% by weight; alkali metal chlorides, in quantities of up to about 20%; zinc compounds such as the oxide or the carbonate, from about 5 to 25%; and minor quantities of certain organic resins. The resins employed generally have a melting point in the range of about 250° to 360° F. and are used in an amount of between about 0.1 and 1.0 weight percent of the flux composition. They may be selected from the gasoline-insoluble resin obtained from the extraction of pine wood in aromatic solvents; the hard, dark-colored, partially gasoline-soluble fraction obtained as a by-product in the manufacture of grade FF wood rosin: and the so-called "modified" resoles of the phenolformaldehyde condensation type. Particularly useful phenol-formaldehyde resins are the resoles modified with rosin esters. Specific rosin ester-modified resoles include the "Beckacite" resins, such as "Beckacite No. 1100," a resole modified with glycerine ester of rosin and the "Pentacite" resins such as "Pentacite No. 1405," a resole modified with the pentaerythritol ester of rosin.

The following examples are provided to illustrate the flux compositions of the invention.

EXAMPLE 1

A flux was prepared by mixing the following ingredients:

|  | Parts by Weight |
| --- | --- |
| Sand, 20 to 30 mesh | 10 |
| Expanded Perlite | 3.2 |
| Resin | 0.2 |
| Ammonium Chloride | 11.7 |
| Potassium Chloride | 6.0 |
| Sodium Chloride | 6.5 |
| Zinc Chloride | 62.4 |
|  | 100.0 |

Another preparation was made using the same proportions of materials, except that the sand was omitted.

Upon testing these two preparations under industrial soldering conditions, it was found that the sand-containing flux had an average pot life within the range of 5 to 6 hours at 725° F while the flux without sand served an average of only 3 to 4 hours under identical conditions.

At other temperatures within the range used in industry, a formulation of the type just described can achieve the following pot lives, with the values in parentheses being obtainable in the absence of sand: 700° F — 300 minutes (210 minutes); 750° F — 210' (150'); 800° F — 90' (50'); and 825° F — 60' (30'). While these life figures are lower than the best of those reported for carbon black-containing high ammonium chloride preparations such as those that have been disclosed in U.S. Pat. No. 3,796,611, it will be recalled that the present composition achieves its effectiveness with only about 12% of the volatile smoke-generating component, thus sensibly reducing air pollution.

EXAMPLES 2 AND 3

In the course of testing the effect of sand on several types of conventional fluxes, it was concluded that for conventional high ammonium chloride, zinc oxide-containing fluxes, i.e. about 90% by weight of $ZnCl_2.2NH_4Cl$ and 7.2% ZnO, the increase in pot life at soldering temperatures ranging from 700° to 825° F averaged about 10%. These preparations contained about 3.2% by weight of either expended perlite (Example 2) or a channel black fluff having a surface area of 105 $m^2/g$ and a particle size of 27 millimicrons (Example 3).

EXAMPLE 4

The same degree of pot life improvement (10%) can be achieved also by adding 10% sand to flux containing a silica (23.1%) prepared according to Example 2 of U.S. Pat. No. 3,350,244. This "silica" is made from a commercial activated silica gel 6–16 mesh U.S. granules, 3:1 crystals ($ZnCl_2.3NH_4Cl$), ammonium chloride and water. The remainder of the flux formulation consists of 73% $ZnCl_2.2NH_4Cl$ and 3.90% of ZnO.

EXAMPLE 5

A sand-containing flux having the composition of the flux of Example 1 was tested in a can manufacturing plant under normal industrial conditions. The can-soldering flux pot was run for 8 hours at a pot temperature of 715° with a total charge of 10 lbs of the flux. A total of 270,000 cans were processed during that period, thus setting the flux capacity at 27,000 cans/lb. It is estimated that at 725° F, this capacity would approximate a rate of 20,000 cans/lb of flux. This level of performance compares very favorably with that of conventional high ammonium chloride carbon and perlite fluxes, especially in view of the significantly lower ammonium content of the instant flux, i.e. about 12% as opposed to more than 25% by weight, as well as the attendant reduction in smoke generation.

From the foregoing examples and discussion, it becomes apparent that the benefits of adding ordinary sand to can-soldering fluxes, either at the point of compounding or at the point of use, can be extended to some degree to any ammonium chloride-containing conventional flux. It would appear that the high density sand particles, as opposed to the ligthweight siliceous additives if the prior art, tend to settle at or near the molten metal-flux interface and act as an insulating layer which help reduce the rate at which ammonium chloride is lost to the atmosphere as smoke. Furthermore, the silicon dioxide of sand reacts with ammonia, water vapor and alkali-halide oxide to form an alkali-halide silicate which is believed to aid in the removal of lead and iron oxides from the soldering rolls by formation of lead and iron silicates as well as other complexes. Finally, the relatively dense sand layer tends to prevent the normal carry-under of flux into the molten metal, while the abrasiveness of the sand particles positively contributes to the cleanliness of the rolls.

It will also be evident to the man skilled in the art that the above considerations also extend to the zinc ammonium chloride fluxes that are conventionally used in hot dip galvanizing processes.

What is claimed is:

1. A composition consisting of (a) about 1 to 50 parts by weight of ordinary sand, and (b) a zinc ammonium chloride flux, sand flux being further characterized by a minimum weight content of zinc chloride-ammonium chloride mixture of at least 60% and an ammonium chloride within the range of 10 to 35%.

2. The composition of claim 1 where the sand content constitutes from about 5 to 25% of the total weight.

3. The composition of claim 1 wherein the flux contains about 10 to 13% ammonium chloride.

4. The composition of claim 1 wherein the sand component consists of 10%, based on the total weight, of a 20 to 30 -mesh U.S. sand.

5. The composition of claim 1 wherein the flux component comprises between about 1.5 and 5% by weight of a light weight particulate inorganic material selected from the group consisting of: carbon blacks; micron-size silica, alumina and silicates; expended perlite and vermiculite; finely divided talc; and mixtures thereof.

6. The process of fluxing metal surfaces to be coated by a layer of molten metal which comprises interposing between a molten metal bath and a supernatent zinc ammonium chloride flux, a layer of ordinary sand with a weight equal to at least about 1 to 50% of the weight of the flux.

7. The process of claim 6 wherein the weight of the sand equals about 5 to 25% of the weight of the flux and its particle size does not exceed about No. 8 mesh U.S.

* * * * *

UNITED STATES PATENT AND TRADEMARK OFFICE
CERTIFICATE OF CORRECTION

PATENT NO. : 4,062,703
DATED : December 13, 1977
INVENTOR(S) : Joseph Vastag

It is certified that error appears in the above-identified patent and that said Letters Patent are hereby corrected as shown below:

Claim 1, line 6, after "chloride" insert --content--.

Signed and Sealed this

Tenth Day of July 1979

[SEAL]

Attest:

LUTRELLE F. PARKER

Attesting Officer — Acting Commissioner of Patents and Trademarks